Sept. 24, 1963     A. S. MacDONALD     3,104,866
POST AND PLANK FENCES
Filed March 13, 1961

INVENTOR
ANGUS SNEAD MACDONALD

BY

ATTORNEYS

United States Patent Office 3,104,866
Patented Sept. 24, 1963

3,104,866
POST AND PLANK FENCES
Angus Snead Macdonald, near Rapidan, Va.; Amy B. Macdonald, Frances Macdonald Gordon, and Angus Avery Macdonald, executors of said Angus Snead Macdonald, deceased, assignors to Everdure, Inc., near Orange, Va., a corporation of Virginia
Filed Mar. 13, 1961, Ser. No. 95,320
3 Claims. (Cl. 256—59)

This invention relates to improvements in post and plank fences and more particularly to such fences as are used for enclosing livestock. Horses and other livestock are frequently injured seriously by running into fences. A horse or group of horses running at full gallop frequently find it impossible to turn aside suddenly when confronted with a fence directly in their paths. This results very often in the animals striking against sharp or angular portions of the fence, with resulting injuries that affect materially the growth and development of the livestock. Even when horses are "fence running," sharp corners and angular projections often cause serious damage to the skins, due to crowding or unobservant contact of the animals with the fence.

Many attempts have been made heretofore to provide fences which will form substantial barricades to confine livestock. None of these have proven entirely satisfactory for this purpose until this invention was developed.

The most accepted practice used for confining thoroughbred horses has been the enclosure by means of plank fences, through nailing of planks directly against the sides of the posts. The angular corners of the planks and of the posts are sufficiently obtrusive to cause skin damage to the horses when the latter run along or directly against the fence. The planks cannot practically be more than one inch thick and thus both the edges of the planks and the edges of the posts are accessible to the animal resulting in injurious condition in many instances.

The object of this invention is to overcome the objections to fences proposed and in use heretofore and to provide a fence which is not only sturdy, but which is safe for use with livestock, particularly horses.

This object is accomplished, according to one embodiment of the invention, by providing half-round posts mounted at intervals in the ground and having preferably flat sides to which are secured planks that are constructed of half-round sections with flat side faces applied directly to the faces of the posts. Suitable fastenings are employed to secure the half-round planks to the posts.

Figure 1:
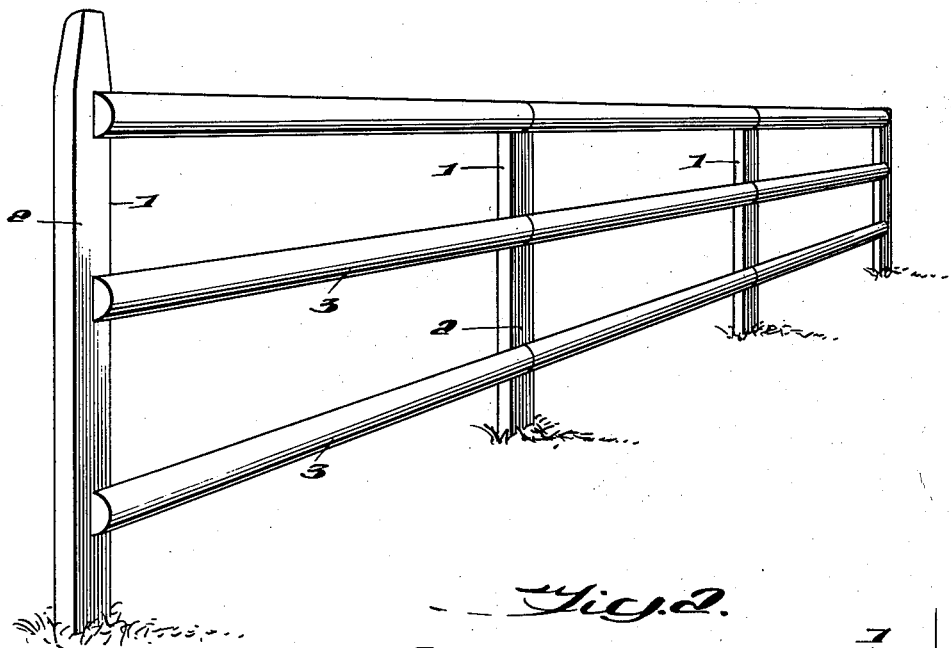
Figure 2:
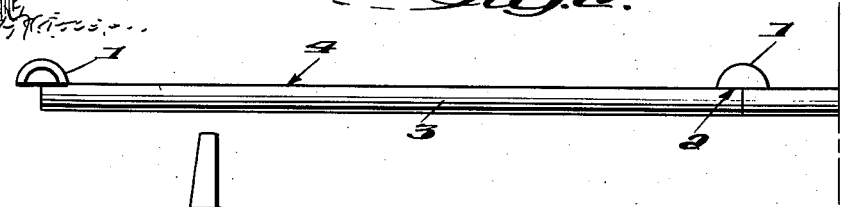
Figure 3:
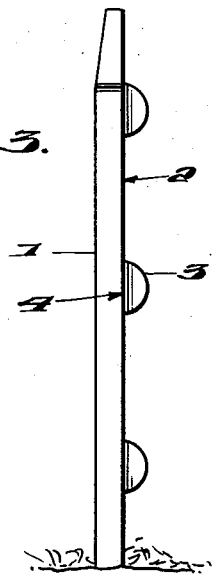
Figure 4:
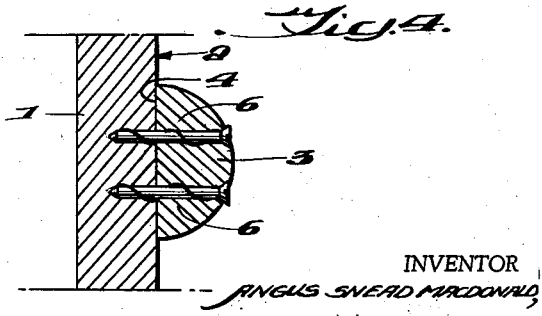

This embodiment of the invention is illustrated in the accompanying drawings, in which:

FIG. 1 is a perspective view of a section of fence constructed according to this invention;
FIG. 2 is a top plan view thereof;
FIG. 3 is an end elevation of the section; and
FIG. 4 is a detail section therethrough.

In the embodiment illustrated in the drawings, the posts are designated generally by the numeral 1 and are adapted to be secured in the ground in upright positions properly spaced apart from each other. Each of the posts is formed of a half-round section, with a flat side face, indicated generally at 2.

Planks are indicated at 3, each of a length to extend preferably between posts and may be sufficiently long to span the distance between three posts, if desired. Each of the planks 3 is formed of semi-cylindrical shape, with a flat side face 4 abutting against the flat face 2 of each post 1. Thus, the exposed surface of each plank 3 is rounded, with no sharp corners, in a direction toward the confined animals.

Any suitable fastening means may be used for securing the planks 3 to the posts 1. However, I have shown and preferably provide, drive-screw nails in the ends of the planks 3, and into the posts 1. Two such nails 6 in each end of each plank will form an effective attachment thereof to the post.

The planks 3 are arranged end-to-end, as shown in FIGS. 1 and 2, and form a continuous, smooth surface along the exposed portion of the fence, without break at each post. The planks are sufficiently thick, preferably two inches or more, whereby the edges of the flat sides of the planes cannot be engaged readily and will not ordinarily contact the skin of a horse either running into the fence or running along it, as the case may be. Thus, complete protection for the animal is afforded, with no sharp corners, exposed edges, or the like, which would damage the skin of the horse.

At the same time a secure and strong structure is provided. The flat sides of the planks, fitting directly against flat sides of the posts, provide effective support and sturdy structure. Fastenings do not work loose, because there is no tendency for the planks to move relative to the posts, even when struck by a strong running animal.

While the invention has been illustrated and described in one embodiment, it is recognized that variations and changes may be made therein, without departing from the invention, as set forth in the claims.

We claim:

1. A fence comprising upright half-round posts and horizontal half-round planks extending between the posts and spaced apart vertically, each of the half-round planks having a flat side face abutting against the half-round posts and having a convex opposite face, the adjacent planks having end faces normal to the length of the planks and abutting directly together.

2. A fence comprising semi-cyclindrical upright posts and horizontal planks extending between the posts and spaced apart vertically, each of the planks being semi-cylindrical with a flat side face abutting against the posts and a semi-cylindrical opposite face opposite to the posts, the adjacent planks having end faces normal to the length of the planks and abutting directly together.

3. A fence comprising upright posts spaced apart horizontally and horizontal planks extending between the posts and spaced apart vertically, each post being semi-cylindrical with a flat side face, each of the planks having a flat side face abutting against the flat face of the post and the opposite face of each plank being semi-cylindrical, the adjacent planks having end faces normal to the length of the planks and abutting directly together, and fastenings extending through the planks into the posts and securing the same together.

References Cited in the file of this patent
UNITED STATES PATENTS

| | | |
|---|---|---|
| 54,459 | York | May 1, 1866 |
| 179,733 | Shaver | July 11, 1876 |
| 242,516 | Du Bois | June 7, 1881 |
| 516,232 | Sliker | Mar. 13, 1894 |
| 2,796,236 | Miller | June 18, 1957 |
| 2,918,261 | Bergeron | Dec. 22, 1959 |